(12) United States Patent
Nagatomo et al.

(10) Patent No.: US 7,511,561 B2
(45) Date of Patent: Mar. 31, 2009

(54) BOOSTING CIRCUIT

(75) Inventors: Shigeru Nagatomo, Miyazaki (JP); Kikuo Utsuno, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 90 days.

(21) Appl. No.: 11/765,519

(22) Filed: Jun. 20, 2007

(65) Prior Publication Data
US 2008/0018382 A1 Jan. 24, 2008

(30) Foreign Application Priority Data
Jul. 20, 2006 (JP) .............................. 2006-197711

(51) Int. Cl.
G05F 1/10 (2006.01)
G05F 3/02 (2006.01)

(52) U.S. Cl. ........................................ 327/536; 383/60
(58) Field of Classification Search ................. 327/536, 327/537; 363/59–61
See application file for complete search history.

(56) References Cited
U.S. PATENT DOCUMENTS
6,392,904 B1 * 5/2002 Bayer et al. .................. 363/59
6,400,211 B1 * 6/2002 Yokomizo et al. ........... 327/536
6,650,555 B2 * 11/2003 Suzuki et al. ................. 363/60
6,859,091 B1 * 2/2005 Nicholson et al. ........... 327/536
7,142,040 B2 * 11/2006 Naka et al. ................... 327/536

FOREIGN PATENT DOCUMENTS
JP          2002369500        12/2002
WO          WO02/061931       8/2002

* cited by examiner

*Primary Examiner*—Lincoln Donovan
*Assistant Examiner*—Patrick O'Neill
(74) *Attorney, Agent, or Firm*—Volentine & Whitt, PLLC

(57) ABSTRACT

The present invention provides a charge-pump boosting circuit. In a charging period of a capacitor C1, a PMOS transistor Q1 and an NMOS transistor Q2 turn on, and the capacitor C1 is charged by voltage between a potential VCC and a potential VSS. On the other hand, in a discharging period of a boosting capacitor, a PMOS transistor Q3 and a PMOS transistor Q4 turn on, and charges accumulated in the boosting capacitor are discharged. In a discharging period of the capacitor C1, a selector SEL1 selects a terminal T1, and a feedback system, in which operation voltage applied to a gate of the PMOS transistor Q3 changes in accordance with fluctuations in output potential VDD2, is formed. At this time, only a resistance component of the PMOS transistor Q3 exists and no differential amplifier is provided, on a path of current flowing-into the capacitor C1 (between the potential VCC and a low voltage side terminal C1N of the boosting capacitor).

4 Claims, 13 Drawing Sheets

BOOSTING CIRCUIT

CROSS-REFERENCE TO RELATED APPLICATION

This application claims priority under 35 USC 119 from Japanese Patent Application No. 2006-197711, the disclosure of which is incorporated by reference herein.

BACKGROUND OF THE INVENTION

1. Field of the Invention

The present invention relates to a boosting circuit for boosting an input voltage and obtaining an output voltage, and in particular, relates to a technique which improves the efficiency of a charge pump boosting circuit.

2. Description of the Related Art

In a charge pump boosting circuit, generally, a charging cycle which carries out charging with respect to a boosting capacitor from the input side, and a discharging cycle which transfers the accumulated charges of the boosting capacitor to the output side, are carried out repeatedly. In the charge pump boosting circuits disclosed in Japanese Patent Application Laid-Open (JP-A) No. 2002-369500 and Reissue Publication of International Patent Disclosure WO 2002/061931, a differential amplifier, at which input voltage is applied to the non-inverting input terminal, and a switching element, which turns on in the charging cycle, are provided at the input side, and a switching element, which turns on in the discharging cycle, is provided at the output side. A portion of the output voltage is fed-back to the inverting input terminal of the differential amplifier.

By connecting the above-described, conventional, charge pump boosting circuit in series, an output voltage which is several times the input voltage can be obtained. Here, in a case in which a high output voltage, e.g., output voltage which is N times the input voltage, is obtained at a conventional boosting circuit, the load current which flows at the output side also becomes N times. Therefore, current of a magnitude of the same extent as this load current must be made to flow into the boosting capacitor.

However, in the conventional charge pump boosting circuit, when an attempt is made to obtain a high output voltage, it is difficult to make current of the same extent as the load current flow-into the boosting capacitor due to the on resistances of the transistor provided within the differential amplifier and the transistor which structures the switching element. Namely, in the conventional charge pump boosting circuit, the higher the output voltage that is attempted to be obtained, the more the boosting efficiency worsens.

On the other hand, in order to decrease the on resistance of the transistor, there exists a method of expanding the gate width, and the like. However, this method is not preferable because it leads to an increase in the surface area occupied by the devices for mounting the boosting circuit.

From the above standpoints, a charge pump boosting circuit, which improves the current driving ability with respect to the boosting capacitor without causing an increase in the surface area occupied by devices, is desired.

SUMMARY OF THE INVENTION

An aspect of the present invention is a boosting circuit boosting a first potential to a second potential, the boosting circuit including: a differential amplifier to which the first potential is inputted, and which outputs a potential corresponding to a change in the second potential; a boosting capacitor alternately repeating a charging period and a discharging period; a first switching element connected between a first reference potential, which is higher than the first potential, and one end of the boosting capacitor, and turning on in the charging period of the boosting capacitor; a second switching element connected between a second reference potential, which is lower than the first potential, and another end of the boosting capacitor, and turning on in the charging period of the boosting capacitor; a third transistor serving as a third switching element which is connected between the first reference potential and the other end of the boosting capacitor, and which turns on in the discharging period of the boosting capacitor; a fourth switching element connected between an output terminal of the second potential and the one end of the boosting capacitor, and turning on in the discharging period of the boosting capacitor; and a first selector selecting the second potential in the charging period of the boosting capacitor, and selecting an output potential of the differential amplifier in the discharging period of the boosting capacitor, and providing a selected potential to a control terminal of the third transistor.

In the boosting circuit of the present invention, in the charging period of the boosting capacitor, the first switching element and the second switching element turn on, and the boosting capacitor is charged by the voltage between the first reference potential and the second reference potential. On the other hand, in the discharging period of the boosting capacitor, the third switching element (third transistor) and the fourth switching element turn on, and the charges accumulated in the boosting capacitor are discharged.

In the boosting circuit of the present invention, in the discharging period of the boosting capacitor, a feedback system, in which the operation voltage applied to the control terminal of the third transistor changes in accordance with fluctuations in the output side second potential, is formed. The second potential is held at the output side.

In the boosting circuit of the present invention, in the discharging period of the boosting capacitor, only a resistance component of the third transistor exists and no differential amplifier is provided, on the path of the current flowing-into the boosting capacitor (between the first reference potential and the other end (the low potential side) of the boosting capacitor). Accordingly, in the boosting circuit of the present invention, the current driving ability at the time of discharging is high.

In accordance with the present invention, the current driving ability with respect to the boosting capacitor can be improved and high boosting efficiency can be realized, without the surface area occupied by devices increasing.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

A first exemplary embodiment of a boosting circuit of the present invention will be described hereinafter.

(Structure of Boosting Circuit)

Figure 1:
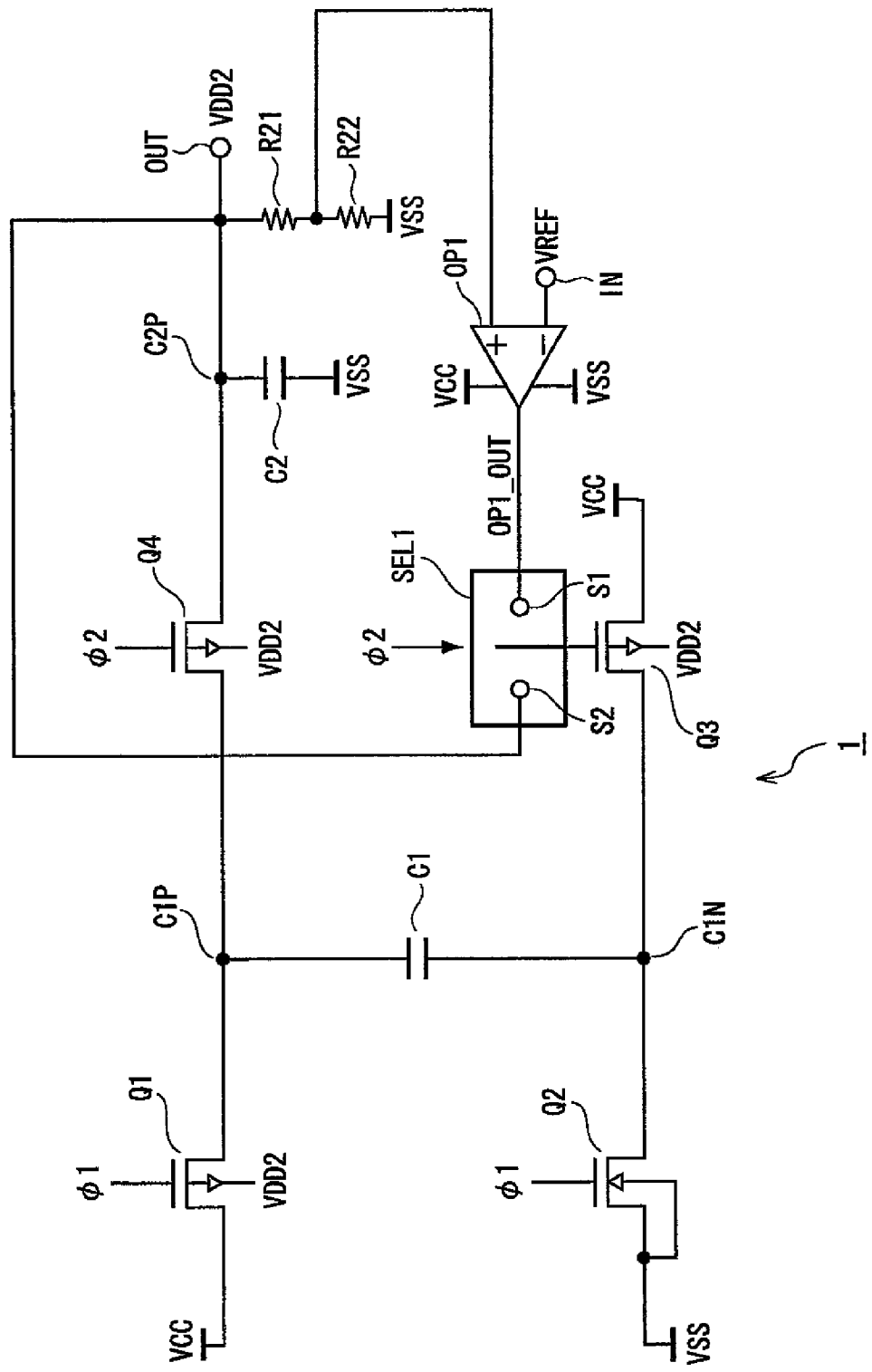
FIG. 1 is a diagram showing the circuit structure of a boosting circuit relating to a first exemplary embodiment.
Figure 2:
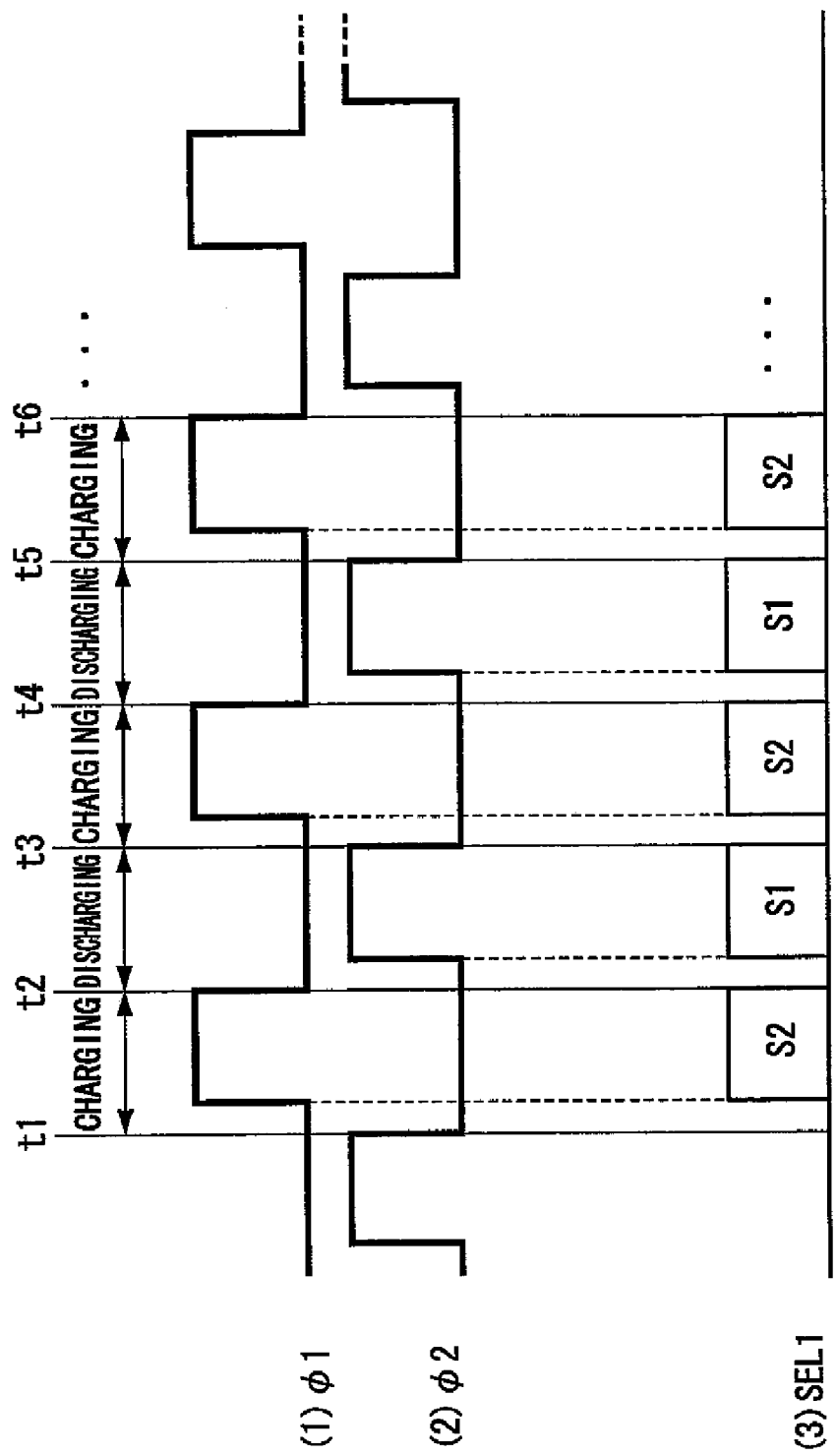
FIG. 2 is a timing chart showing clock signals, which are provided to the boosting circuit relating to the first exemplary embodiment, and the selection operation of a selector.

First, the structure of a boosting circuit 1 relating to the present exemplary embodiment will be described with reference to FIG. 1 and FIG. 2. FIG. 1 is a diagram showing the circuit structure of the boosting circuit 1 relating to the present exemplary embodiment. FIG. 2 is a timing chart showing (1) a clock signal φ1 and (2) a clock signal φ2 which are provided to the boosting circuit 1, and the selection operation of (3) a selector SEL1 (which will be described later).

The boosting circuit 1 shown in FIG. 1 is a circuit at which potential VREF is provided to an input terminal IN, and which outputs, from output terminal OUT, a voltage which is two times the input voltage arising at the input terminal. Namely, given that the potential of the output terminal OUT is VDD2, the boosting circuit 1 is a circuit at which an output voltage (VDD2-VSS) becomes two times an input voltage (VREF-VSS).

Further, the potential VREF which is inputted to the boosting circuit 1 is given as a level which satisfies potential VSS<potential VREF<potential VCC. Note that, in the following description, unless otherwise specified, voltage indicates voltage which is based on the potential VSS. The potential VSS is connected, for example, to ground potential.

The boosting circuit 1 relating to the present exemplary embodiment has transistors Q1 through Q4 which operate in accordance with the clock signals φ1, φ2, a capacitor C1 serving as a boosting capacitor, a capacitor C2 holding output voltage, a selector SEL1 serving as a first selector, a differential amplifier OP1, and resistors R21, R22 serving as sense resistors.

The capacitor C1 has one end C1P at the high potential side and another end C1N at the low potential side, and repeatedly carries out charging and discharging. Namely, as shown by (1) and (2) in FIG. 2, the capacitor C1 carries out charging when the clock signal φ1 is high level, and carries out discharging when the clock signal φ2 is high level. There are no cases in which both of the clock signals φ1, φ2 are high level.

The PMOS transistor Q1 serving as a first switching element, and the NMOS transistor Q2 serving as a second switching element, are transistors which turn on in the charging period of the capacitor C1.

The source of the PMOS transistor Q1 is connected to the potential VCC, and the drain is connected to the terminal C1P of the capacitor C1. The PMOS transistor Q1 operates in accordance with the clock signal φ1 which is provided to the gate.

The source of the NMOS transistor Q2 is connected to the potential VSS, and the drain is connected to the terminal C1N of the capacitor C1. The NMOS transistor Q2 operates in accordance with the clock signal φ1 provided to the gate.

The PMOS transistor Q3 serving as a third switching element, and the PMOS transistor Q4 serving as a fourth switching element, are transistors which turn on in the discharging period of the capacitor C1.

The source of the PMOS transistor Q3 is connected to the potential VCC, and the drain is connected to the terminal C1N of the capacitor C1. The PMOS transistor Q3 operates by either of terminals S1 or S2 of the selector SEL1 being connected to the gate.

The source of the PMOS transistor Q4 is connected to the terminal C1P of the capacitor C1, and the drain is connected to the output terminal OUT (the output potential VDD2). The PMOS transistor Q4 operates in accordance with the clock signal φ2 provided to the gate.

One end C2P of the capacitor C2 at the high potential side thereof is provided so as to be connected between the drain of the PMOS transistor Q4 and the output terminal OUT. The other end at the low potential side of the capacitor C2 is connected to the potential VSS. During the discharging period of the capacitor C1, the charges which were accumulated in the capacitor C1 are transferred to the capacitor C2. Further, during the charging period, the capacitor C2 holds the output potential at VDD2, and also functions as a smoothing capacitor which reduces ripples of the output voltage.

In accordance with the level of the clock signal φ2, the selector SEL1 selects either of the terminal S1, which is connected to the output terminal of the differential amplifier OP1, or the terminal S2, which is connected to the output potential VDD2, and connects it to the gate of the PMOS transistor Q3. Specifically, as shown by (3) in FIG. 2, the selector SEL1 selects the terminal S2 during the period when the clock signal φ2 is low level (the charging period), and selects the terminal S1 during the period when the clock signal φ2 is high level (the discharging period).

The potential level, which is divided by the resistors R21, R22 connected between the output potential VDD2 and the potential VSS, is inputted to the non-inverting input terminal (+) of the differential amplifier OP1, and the predetermined potential VREF is inputted to the inverting input terminal (−) of the differential amplifier OP1 from the input terminal IN, and potential OP1_OUT is outputted from the output terminal of the differential amplifier OP1. The potential OP1_OUT is an intermediate potential between the potential VCC and the potential VSS.

The aforementioned selector SEL1 selects the terminal S1 in the discharging period, and the output potential OP1_OUT of the differential amplifier OP1 is applied to the gate of the PMOS transistor Q3. In this way, during the discharging period, a feedback system, in which a voltage $V_{GS}$ between the gate and source of the PMOS transistor Q3 varies in accordance with the fluctuations in the output potential VDD2, is formed at the boosting circuit 1 of the present exemplary embodiment.

The ratio of the resistance values of the resistors R21, R22 which serve as sense resistors prescribes the loop gain in the feedback system of the boosting circuit 1, and is determined such that the input potential VREF and the potential of the non-inverting input terminal of the differential amplifier OP1 become the same. In the case of the present exemplary embodiment, because the output voltage is made to become twice the input voltage, R21:R22=1:1.

(Operation of Boosting Circuit)

Operation of the boosting circuit 1 relating to the present exemplary embodiment will be described next with reference to FIG. 3 and FIG. 4.

(1) Operation During Charging Period

First, the operation during the charging period of the boosting circuit 1 will be described with reference to FIG. 3.

As shown in FIG. 2, during the charging period of the boosting circuit 1, the clock signal φ1 becomes high level, the clock signal φ2 becomes low level, and the selector SEL1 selects the terminal S2. In this way, the PMOS transistor Q1 and the NMOS transistor Q2 turn on. Because the potential VDD2 (>VCC) is applied to the gate of the PMOS transistor Q3 and the voltage $V_{GS}$ between the gate and the source becomes $V_{GS}$>0, the PMOS transistor Q3 turns off. The PMOS transistor Q4 also turns off.

Figure 3:
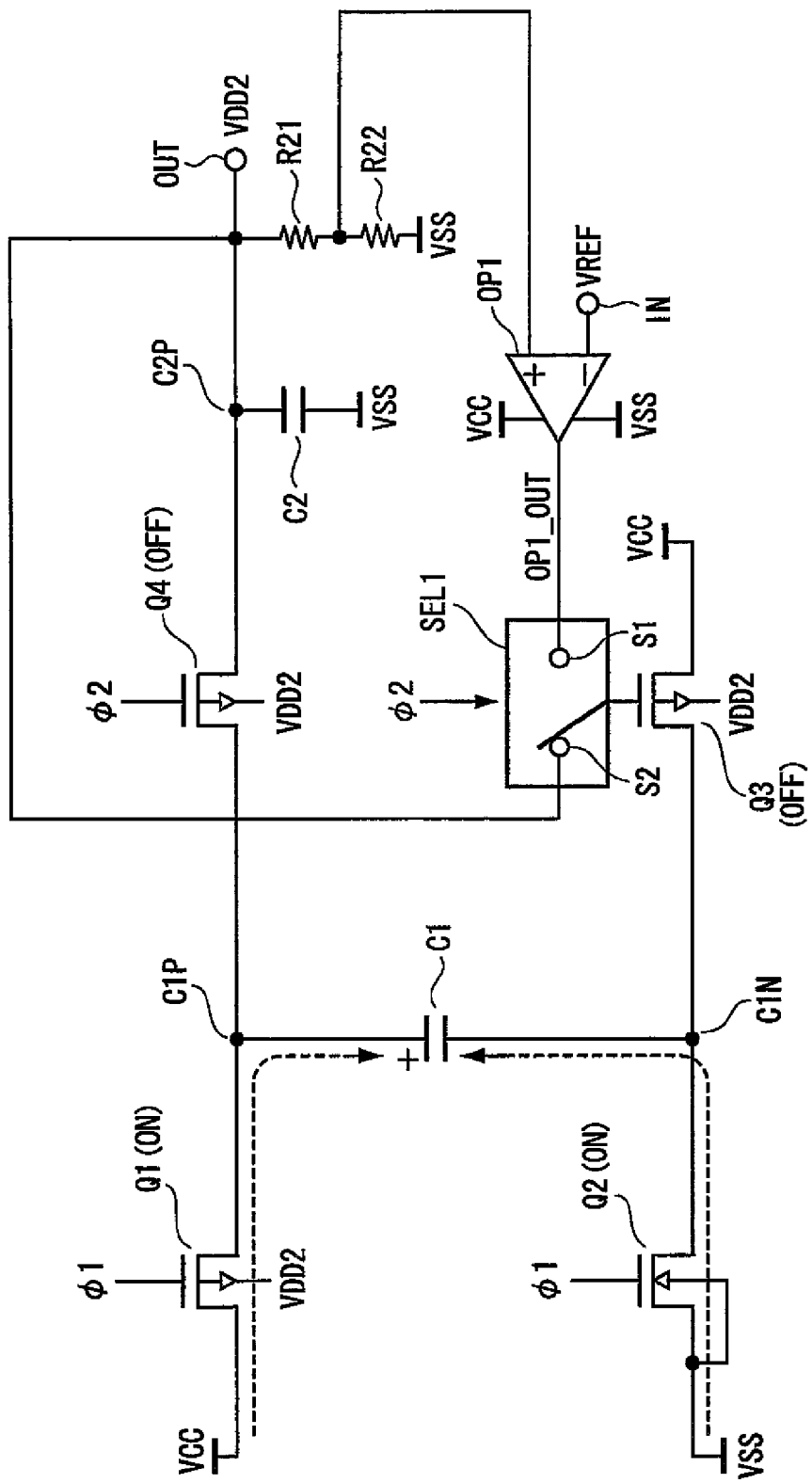
FIG. 3 is a diagram showing a charging operation of the boosting circuit relating to the first exemplary embodiment.

Accordingly, as shown in FIG. 3, at the capacitor C1, voltage (VCC-VSS) is applied and charges are accumulated.

(2) Operation During Discharging Period (Boosting Operation)

Next, operation during the discharging period of the boosting circuit 1 will be described with reference to FIG. 4.

As shown in FIG. 2, during the discharging period of the boosting circuit 1, the clock signal φ1 becomes low level, the clock signal φ2 becomes high level, and the selector SEL1 selects the terminal S1. In this way, the PMOS transistor Q1 and the NMOS transistor Q2 turn off. Because the output potential OP1_OUT (an intermediate potential between the potential VCC and the potential VSS) of the differential amplifier OP1 is applied to the gate of the PMOS transistor Q3 and the voltage $V_{GS}$ between the gate and the source becomes $V_{GS}$<0, the PMOS transistor Q3 turns on. The PMOS transistor Q4 also turns on.

Figure 4:
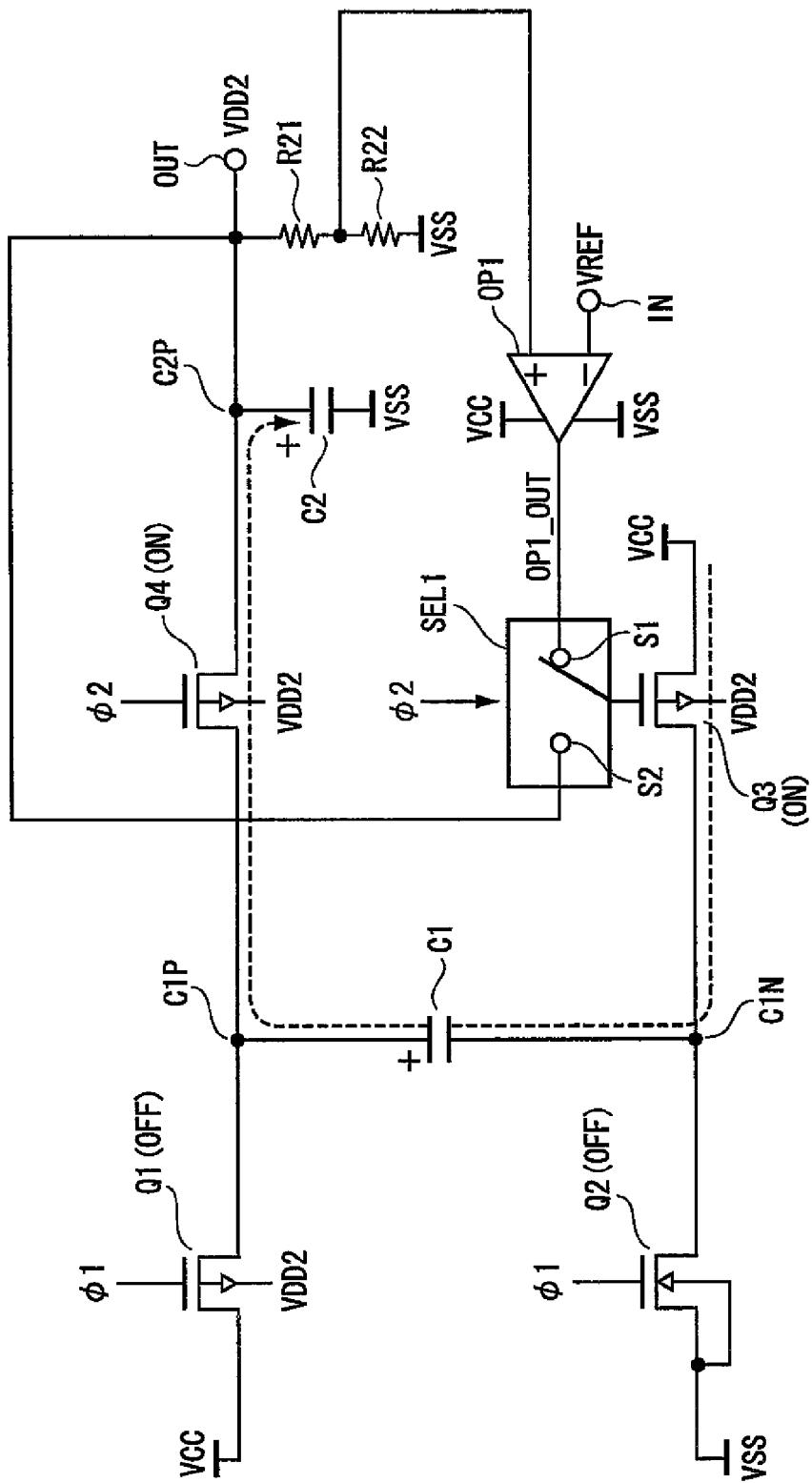
FIG. 4 is a diagram showing a discharging operation of the boosting circuit relating to the first exemplary embodiment.

Accordingly, as shown in FIG. 4, the charges accumulated in the capacitor C1 are transferred to the capacitor C2.

In the discharging period of boosting circuit 1, due to the operation of the differential amplifier OP1, the output voltage (VDD2-VSS) is always maintained at twice the input voltage (VREF-VSS). This point will be explained hereinafter. Note that, in the following explanation, the state in which the output voltage is twice the input voltage is called the "equilibrium state".

In the boosting circuit 1, due to the above-described circuit structure, the differential amplifier OP1 monitors the output potential VDD2 via the sense resistors (R21, R22). If the equilibrium state breaks down and the output voltage becomes higher than twice the input voltage, the potential inputted to the non-inverting input terminal (+) of the differential amplifier OP1 becomes higher than the potential VREF of the inverting input terminal (−). Therefore, the output potential OP1_OUT of the differential amplifier OP1 becomes higher than in the case of the equilibrium state. Thus, the voltage $V_{GS}$ between the gate and the source of the PMOS transistor Q3 falls to below that in the case of the equilibrium state, and the on resistance of the PMOS transistor Q3 increases. Due to this increase in the on resistance of the PMOS transistor Q3, the input current to the capacitor C1 decreases, and the voltage between the terminals of the capacitor C1 decreases. The output voltage thereby decreases.

On the other hand, if the equilibrium state breaks down and the output voltage becomes lower than twice the input voltage, the potential inputted to the non-inverting input terminal (+) of the differential amplifier OP1 becomes lower than the potential VREF of the inverting input terminal (−). Therefore, the output potential OP1_OUT of the differential amplifier OP1 becomes lower than in the case of the equilibrium state. Thus, the voltage $V_{GS}$ between the gate and the source of the PMOS transistor Q3 becomes higher than that in the case of the equilibrium state, and the on resistance of the PMOS transistor Q3 decreases. Due to this decrease in the on resistance of the PMOS transistor Q3, the input current to the capacitor C1 increases, and the voltage between the terminals of the capacitor C1 becomes high. The output voltage thereby becomes high.

At the boosting circuit 1, changes in the output voltage are reflected instantaneously in changes in the current flowing through the PMOS transistor Q3. Therefore, during the discharging period, the above-described equilibrium state, i.e., the state in which the output voltage is twice the input voltage, can be always maintained.

A conventional charge pump boosting circuit includes a differential amplifier and a switching element on the path of the current which flows-in to the boosting capacitor during the discharging period (see, for example, FIG. 3(B) of aforementioned JP-A No. 2002-369500). Therefore, there are cases in which the on resistances of the transistor provided within the differential amplifier and the transistor structuring the switching element become large, and current corresponding to the load current at the output side cannot flow-into the boosting capacitor.

On the other hand, referring to FIG. 4, in the boosting circuit 1 of the present exemplary embodiment, on the path of the current which flows-into the boosting capacitor (i.e., between the potential VCC and the terminal C1N of the capacitor C1), only the on resistor of the PMOS transistor Q3 exists and a differential amplifier is not interposed therebetween. Accordingly, in the boosting circuit 1 of the present exemplary embodiment, as compared with a conventional boosting circuit, the current driving ability at the time of discharging is high, and therefore, even in cases in which an attempt is made to obtain a high output voltage, high boosting efficiency can be realized.

As described above, the boosting circuit relating to the present exemplary embodiment has the differential amplifier OP1 which operates in accordance with the changes in the output voltage, the transistor Q3 (third transistor) which turns on during the discharging period of the capacitor C1 (boosting capacitor) and causes current to flow from the potential VCC into the capacitor C1, and the selector SEL1 (first selector) which selects the output potential of the differential amplifier in the discharging period of the capacitor C1 and applies that output potential to the gate of the transistor Q3. Therefore, during the discharging period, a desired output voltage (in the above-described exemplary embodiment, twice the input voltage) is maintained by the feedback system which includes the differential amplifier OP1, and, because the differential amplifier OP1 is not included on the current supply path to the capacitor C1 via the transistor Q3, the current driving ability is high. Accordingly, this boosting circuit can increase the boosting efficiency, in particular in cases in which an attempt is made to obtain a high output voltage.

Further, in a MOS transistor, the gate width and the on resistance have an inversely proportional relationship. However, this boosting circuit does not require use of the means of expanding the gate width of the PMOS transistor Q3 in order to decrease the on resistance of the PMOS transistor Q3 and increase the boosting efficiency, and the surface area occupied by the devices which form the boosting circuit does not increase. In other words, presupposing the same device surface area and the same boosting efficiency, in the boosting circuit relating to the present exemplary embodiment, the differential amplifier OP1 does not exist on the current supply path to the boosting capacitor, as compared with the conventional boosting circuit. Therefore, there is the leeway to set the on resistance of the PMOS transistor Q3 to be that much greater, and the gate width of the PMOS transistor Q3 can be made to be small.

Second Exemplary Embodiment

A second exemplary embodiment of a boosting circuit of the present invention will be described next.

Figure 5:
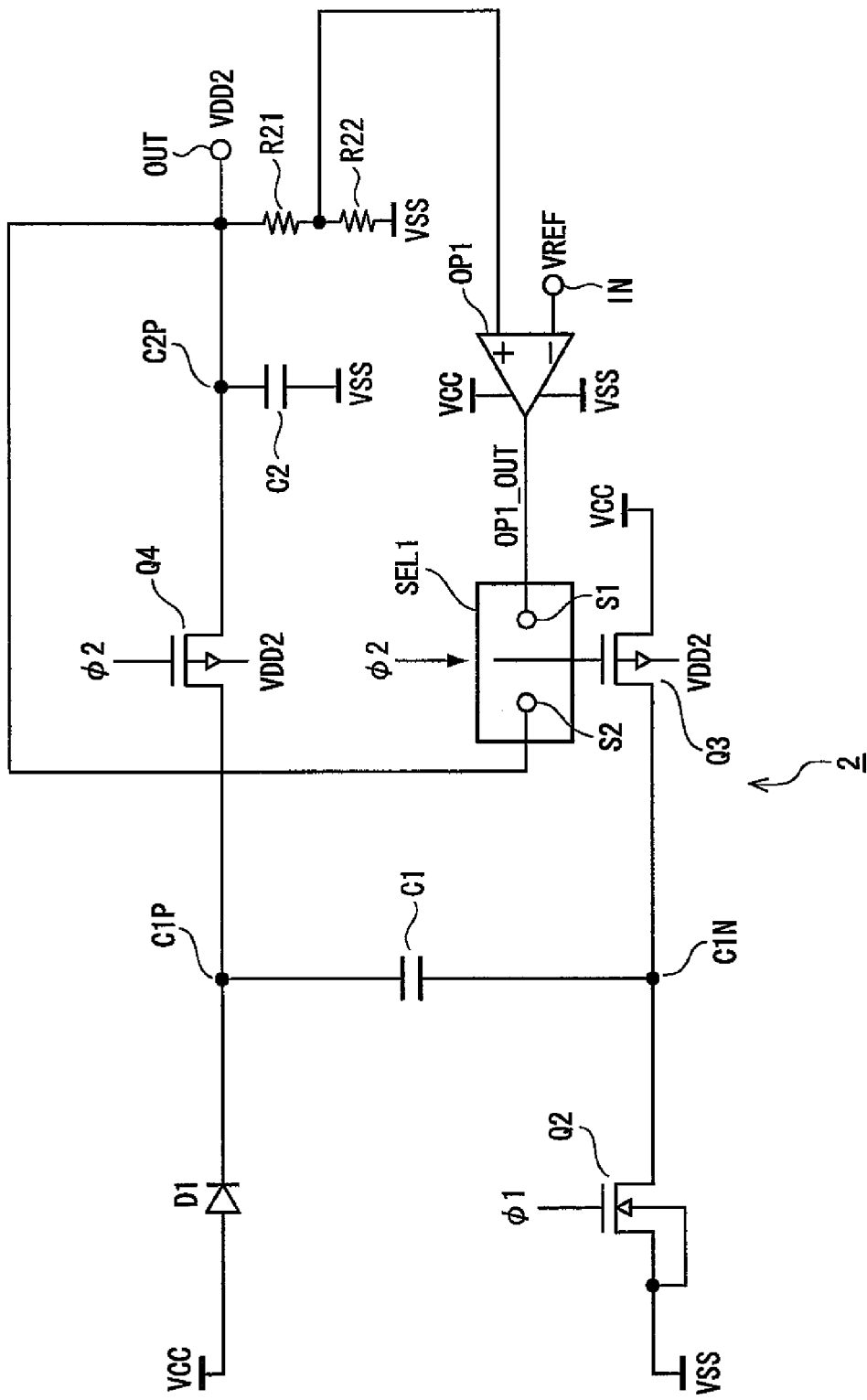
FIG. 5 is a diagram showing the circuit structure of a boosting circuit relating to a second exemplary embodiment.

FIG. 5 is a circuit diagram showing the structure of the boosting circuit in the present exemplary embodiment. Regions which are the same as those of the boosting circuit of the first exemplary embodiment shown in FIG. 1 are denoted by the same reference numerals, and repeat description thereof is omitted.

(Structure of Boosting Circuit)

First, the structure of a boosting circuit 2 relating to the present exemplary embodiment will be described with reference to FIG. 5.

In the boosting circuit 2 relating to the present exemplary embodiment, a diode D1 is provided instead of the PMOS transistor Q1 in the boosting circuit 1 relating to the first exemplary embodiment (see FIG. 1). The anode of the diode D1 is connected to the potential VCC, and the cathode thereof is connected to the terminal C1P of the capacitor C1. The structure of the boosting circuit 2 other than the diode D1 is the same as that of the boosting circuit 1 relating to the first exemplary embodiment.

(Operation of Boosting Circuit)

Operation of the boosting circuit 2 will be described next.

In the boosting circuit 2, because the diode D1 is provided such that the forward direction is from the potential VCC toward the high potential side terminal C1P of the capacitor C1, charges are accumulated in the capacitor C1 via the diode D1 from before the boosting circuit 2 starts-up. Therefore, at the time of the charging operation, at the point in time when the clock signal φ1 applied to the gate of the NMOS transistor Q2 becomes high level, there is extremely little rush current flowing from the potential VCC toward the capacitor C1. Accordingly, in the boosting circuit 2 relating to the present exemplary embodiment, the circuit elements can be protected from rush current at the time of charging.

Note that the operation during the discharging period of the boosting circuit 2 is similar to that of the above-described boosting circuit 1. Further, in the boosting circuit 2, instead of the diode D1, a PMOS transistor with a parasitic diode can be used.

Third Exemplary Embodiment

A third exemplary embodiment of a boosting circuit of the present invention will be described next.

Figure 6:
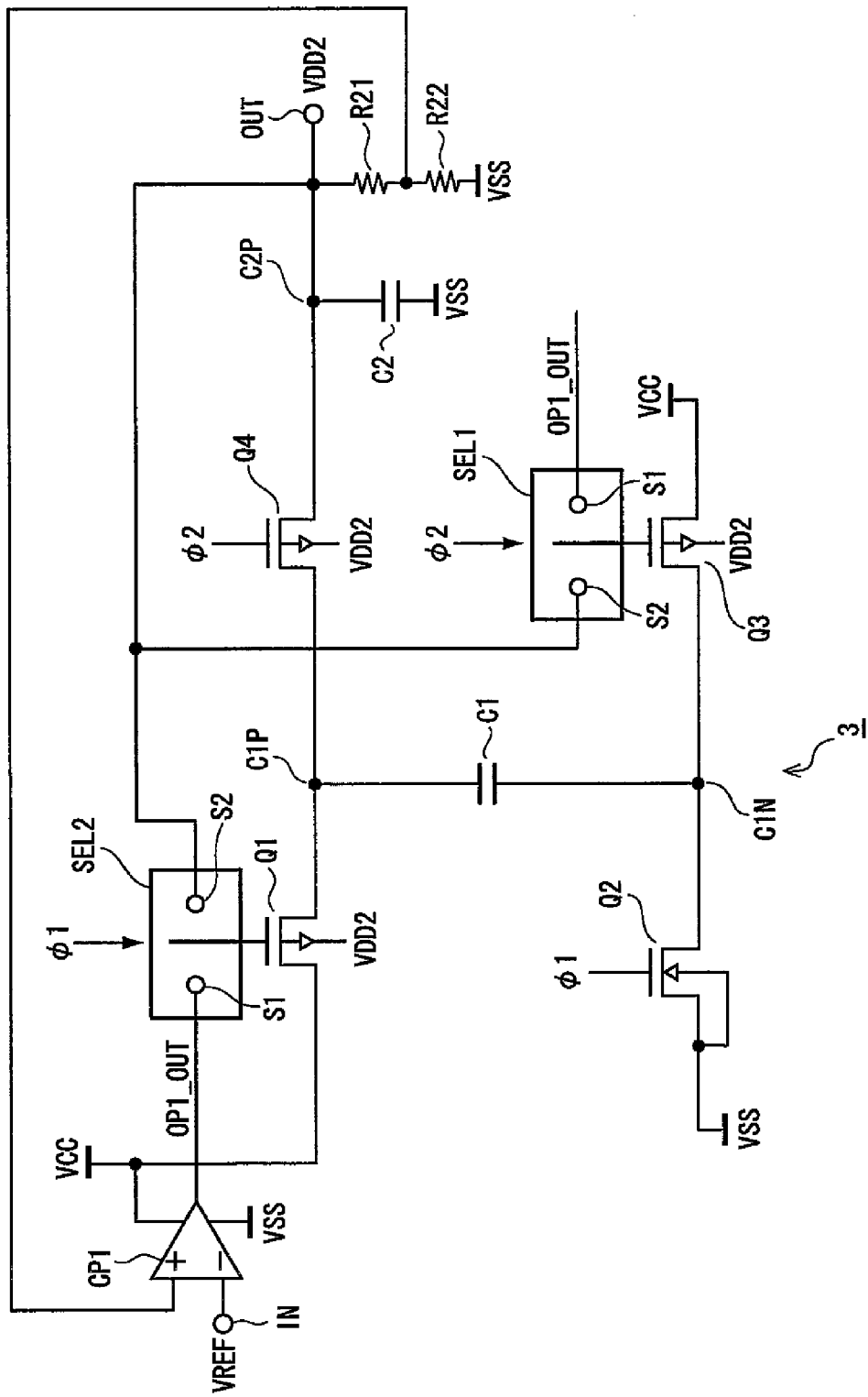
FIG. 6 is a diagram showing the circuit structure of a boosting circuit relating to a third exemplary embodiment.

FIG. 6 is a circuit diagram showing the structure of the boosting circuit in the present exemplary embodiment. Regions which are the same as those of the boosting circuit of the first exemplary embodiment shown in FIG. 1 are denoted by the same reference numerals, and repeat description thereof is omitted.

(Structure of Boosting Circuit)

Figure 7:
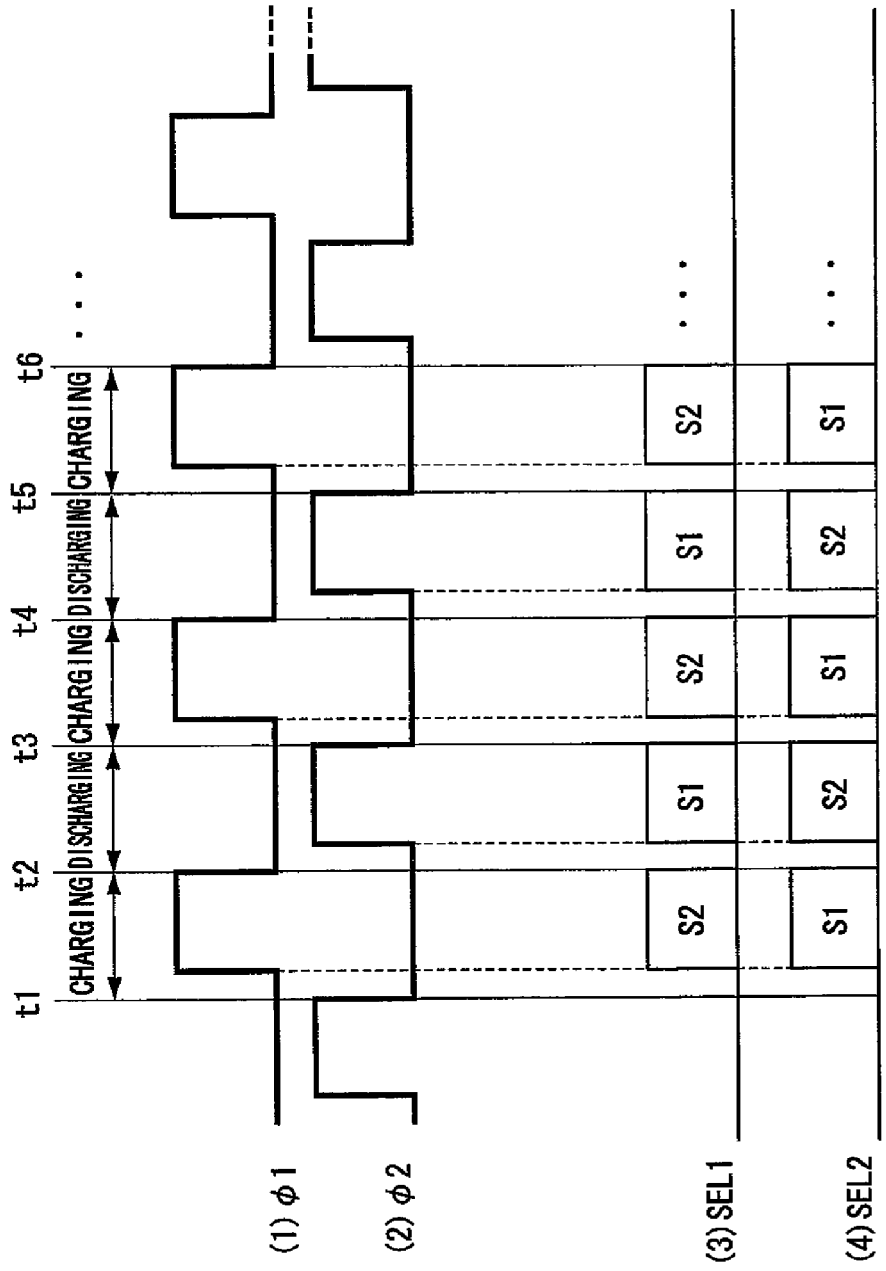
FIG. 7 is a timing chart showing clock signals, which are provided to the boosting circuit relating to the third exemplary embodiment, and the selection operations of selectors.

First, the structure of a boosting circuit 3 relating to the present exemplary embodiment will be described with reference to FIG. 6 and FIG. 7. FIG. 7 is a timing chart showing (1) the clock signal φ1 and (2) the clock signal φ2 which are provided to the boosting circuit 3, and the selection operations of (3) the selector SEL1 and (4) a selector SEL2 (which will be described later).

In the boosting circuit 3 relating to the present exemplary embodiment, as compared with the boosting circuit 1 (see FIG. 1), the structure provided at the gate of the PMOS transistor Q3 is similarly provided for the gate of the PMOS transistor Q1 as well. Namely, the boosting circuit 3 is additionally provided with the selector SEL2 serving as a second selector, as compared with the boosting circuit 1.

In accordance with the level of the clock signal φ1, the selector SEL2 selects either of the terminal S1, which is connected to the output terminal of the differential amplifier OP1, and the terminal S2, which is connected to the output potential VDD2, and connects it to the gate of the PMOS transistor Q1. Specifically, as shown by (4) in FIG. 7, the selector SEL2 selects the terminal S1 in the period when the clock signal φ1 is high level (the charging period), and selects the terminal S2 in the period when the clock signal φ1 is low level (the discharging period).

On the other hand, in the same way as the case of the first exemplary embodiment, as shown by (3) in FIG. 7, the selector SEL1 selects the terminal S2 in the period when the clock signal φ1 is high level (the charging period), and selects the terminal S1 in the period when the clock signal φ2 is high level (the discharging period).

In accordance with the above-described structure, in the boosting circuit 3 relating to the present exemplary embodiment, during the charging period, a feedback system, in which the voltage $V_{GS}$ between the gate and the source of the PMOS transistor Q1 varies in accordance with fluctuations in the output potential VDD2, is formed via the differential amplifier OP1, and, during the discharging period, a feedback system, in which the voltage $V_{GS}$ between the gate and the source of the PMOS transistor Q3 varies in accordance with fluctuations in the output potential VDD2, is formed via the differential amplifier OP1.

(Operation of Boosting Circuit)

Operation of the boosting circuit 3 relating to the exemplary embodiment will be described next with reference to FIG. 8 and FIG. 9.

(1) Operation During Charging Period

First, the operation during the charging period of the boosting circuit 3 will be described with reference to FIG. 8.

As shown in FIG. 7, during the charging period of the boosting circuit 3, the clock signal φ1 becomes high level, the clock signal φ2 becomes low level, the selector SEL1 selects the terminal S2, and the selector SEL2 selects the terminal S1.

In this way, the output potential OP1_OUT (an intermediate potential between the potential VCC and the potential VSS) of the differential amplifier OP1 is applied to the gate of the PMOS transistor Q1, and the voltage $V_{GS}$ between the gate and the source becomes $V_{GS}<0$, and therefore, the PMOS transistor Q1 turns on. The high level clock signal φ1 is applied to the gate of the NMOS transistor Q2, and the NMOS transistor Q2 turns on.

The potential VDD2 (>VCC) is applied to the gate of the PMOS transistor Q3, and the voltage $V_{GS}$ between the gate and the source becomes $V_{GS}>0$, and therefore, the PMOS transistor Q3 turns off. The PMOS transistor Q4 also turns off.

Figure 8:
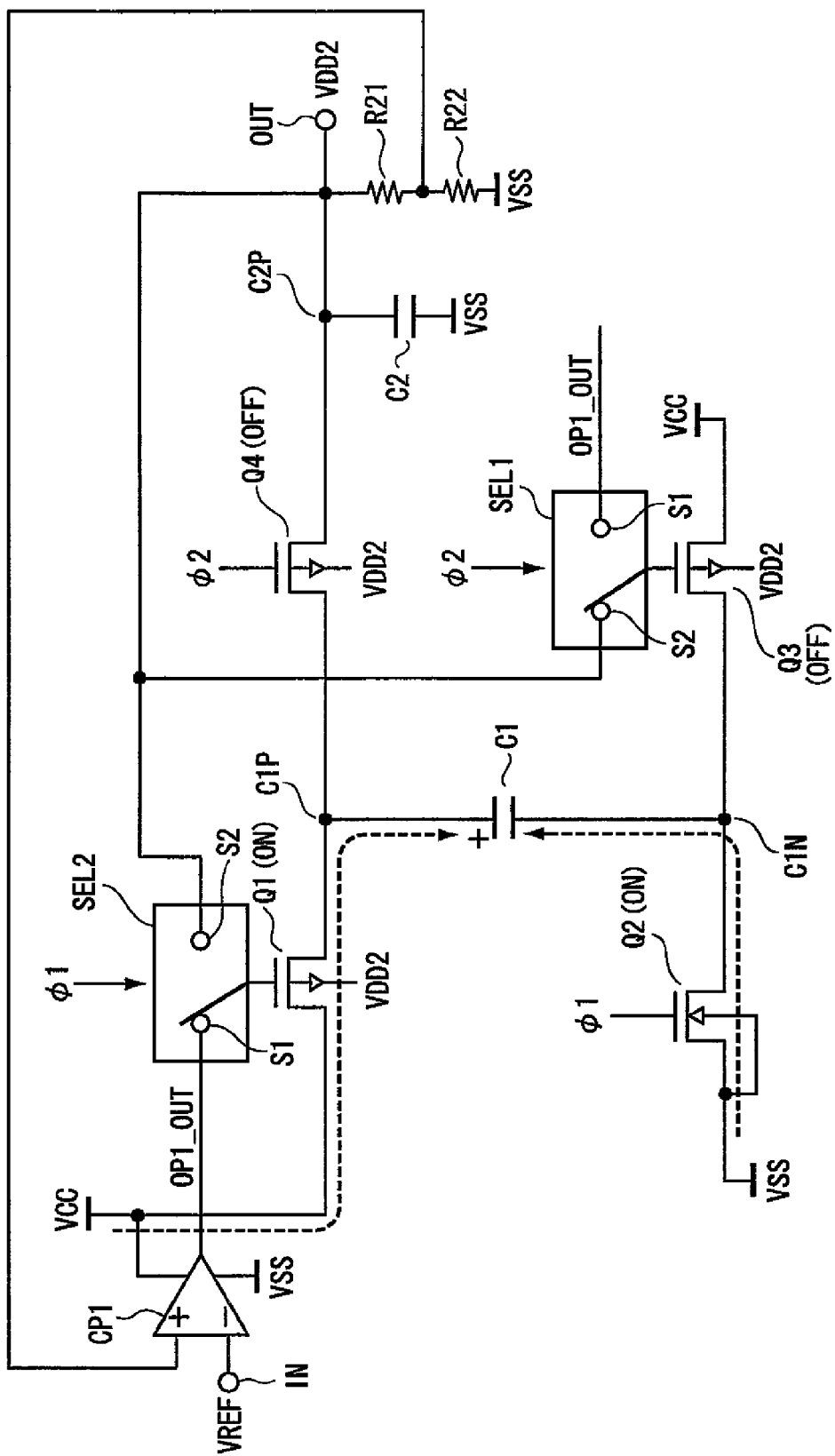
FIG. 8 is a diagram showing a charging operation of the boosting circuit relating to the third exemplary embodiment.

Accordingly, as shown in FIG. 8, at the capacitor C1, the voltage (VCC-VSS) is applied and charges are accumulated.

During the charging period of the boosting circuit 3, the potential V_C1P of the high potential side terminal C1P of the capacitor C1 is controlled by the operation of the differential amplifier OP1 so as to become the same as the potential VREF. This point will be explained hereinafter. Note that, in the following explanation, the state in which the potential V_C1P of the terminal C1P is the same as the potential VREF is called the "equilibrium state".

Further, due to the discharging operation (which will be described later) of the boosting circuit 3, the output voltage (VDD2-VSS) is always maintained at twice the input voltage (VREF-VSS). During the charging period of the boosting circuit 3, in the equilibrium state, potential corresponding to the potential VREF is applied to the non-inverting input terminal of the differential amplifier OP1.

In the boosting circuit 3, due to the above-described circuit structure, in the charging period, the differential amplifier OP1 monitors the output potential VDD2 via the sense resistors (R21, R22). If the equilibrium state breaks down and the output voltage becomes higher than twice the input voltage, the potential inputted to the non-inverting input terminal (+) of the differential amplifier OP1 becomes higher than the potential VREF of the inverting input terminal (−). Therefore, the output potential OP1_OUT of the differential amplifier OP1 becomes higher than in the case of the equilibrium state. Thus, the voltage $V_{GS}$ between the gate and the source of the PMOS transistor Q1 falls to below that in the case of the equilibrium state, and the on resistance of the PMOS transistor Q1 increases. Due to this increase in the on resistance of the PMOS transistor Q1, the input current to the capacitor C1 decreases, and the voltage between the terminals of the capacitor C1 decreases. The potential V_C1P of the terminal C1P thereby decreases.

On the other hand, if the equilibrium state breaks down and the output voltage becomes lower than twice the input voltage, the potential inputted to the non-inverting input terminal (+) of the differential amplifier OP1 becomes lower than the potential VREF of the inverting input terminal (−). Therefore, the output potential OP1_OUT of the differential amplifier OP1 becomes lower than in the case of the equilibrium state. Thus, the voltage $V_{GS}$ between the gate and the source of the PMOS transistor Q1 becomes higher than that in the case of the equilibrium state, and the on resistance of the PMOS transistor Q1 decreases. Due to this decrease in the on resistance of the PMOS transistor Q1, the input current to the capacitor C1 increases, and the voltage between the terminals of the capacitor C1 rises. The potential V_C1P of the terminal C1P thereby rises.

At the boosting circuit 3, changes in the output voltage are reflected instantaneously in changes in the current flowing through the PMOS transistor Q1. Therefore, during the charging period, the above-described equilibrium state, i.e., the state in which the potential V_C1P of the terminal C1P of the capacitor C1 is the same as the potential VREF, can be always maintained. Namely, differently than in the boosting circuit 1 relating to the first exemplary embodiment, the voltage applied to the capacitor C1 is limited to (VREF-VSS) in the charging period.

(2) Operation During Discharging Period (Boosting Operation)

Next, operation during the discharging period of the boosting circuit 3 will be described with reference to FIG. 9.

As shown in FIG. 7, during the discharging period of the boosting circuit 3, the clock signal φ1 becomes low level, the clock signal φ2 becomes high level, the selector SEL1 selects the terminal S1, and the selector SEL2 selects the terminal S2.

In this way, the potential VDD2 (>VCC) is applied to the gate of the PMOS transistor Q1, and the voltage $V_{GS}$ between the gate and the source becomes $V_{GS}$>0, and therefore, the PMOS transistor Q1 turns off. The NMOS transistor Q2 also turns off.

The output potential OP1_OUT (an intermediate potential between the potential VCC and the potential VSS) of the differential amplifier OP1 is applied to the gate of the PMOS transistor Q3, and the voltage $V_{GS}$ between the gate and the source becomes $V_{GS}$<0, and therefore, the PMOS transistor Q3 turns on. The PMOS transistor Q4 also turns on.

Figure 9:
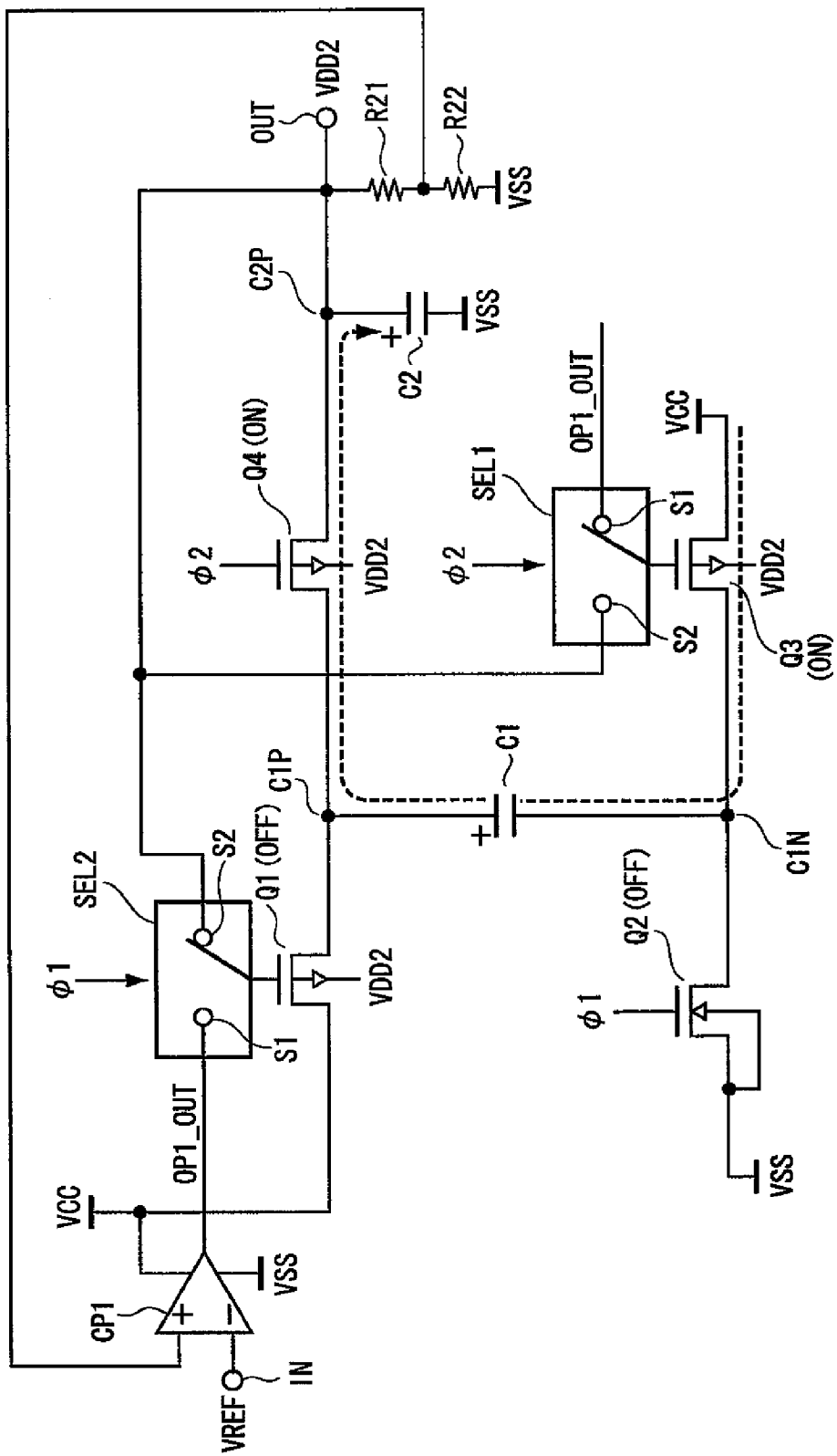
FIG. 9 is a diagram showing a discharging operation of the boosting circuit relating to the third exemplary embodiment.

Accordingly, as shown in FIG. 9, the charges accumulated in the capacitor C1 discharge and are transferred to the capacitor C2.

Namely, in the discharging period, the boosting circuit 3 becomes the same structure as the above-described boosting circuit 1 (FIG. 1), and the operation thereof is the same as that of the boosting circuit 1. Accordingly, in the same way as the boosting circuit 1, at the boosting circuit 3, due to the feedback of the output voltage to the gate of the PMOS transistor Q3, the output voltage can be maintained at twice the input voltage, and a high current driving ability can be obtained.

As described above, in addition to the structure of the boosting circuit 1 of the first exemplary embodiment, the boosting circuit relating to the present exemplary embodiment further has the selector SEL2 (second selector) which, in the charging period, selects the output potential of the differential amplifier OP1, and provides this output potential to the gate of the PMOS transistor Q1. Therefore, in addition to similar effects as those of the boosting circuit 1 of the first exemplary embodiment being obtained, in the charging period, the voltage applied to the capacitor C1 is limited to (VREF-VSS) by the feedback system which includes the differential amplifier OP1. Accordingly, in the boosting circuit of the present exemplary embodiment, it suffices for there to be a small charged amount during the charging period of one time, and rush current can be suppressed.

In the boosting circuit, there is no need to use the means of expanding the gate widths of the PMOS transistors Q1, Q3 in order to decrease the on resistances of the PMOS transistors Q1, Q3 and increase the boosting efficiency, and the surface area occupied by the devices which form the boosting circuit will not increase. In other words, presupposing the same device surface area and the same boosting efficiency, in the boosting circuit relating to the present exemplary embodiment, the differential amplifier OP1 does not exist on the current supply path to the boosting capacitor, as compared with the conventional boosting circuit. Therefore, it can also be said that there is the leeway to set the on resistances of the PMOS transistors Q1, Q3 to be that much greater, and the gate widths of the PMOS transistors Q1, Q3 can be made to be small.

Fourth Exemplary Embodiment

A fourth exemplary embodiment of a boosting circuit of the present invention will be described next.

Figure 10:
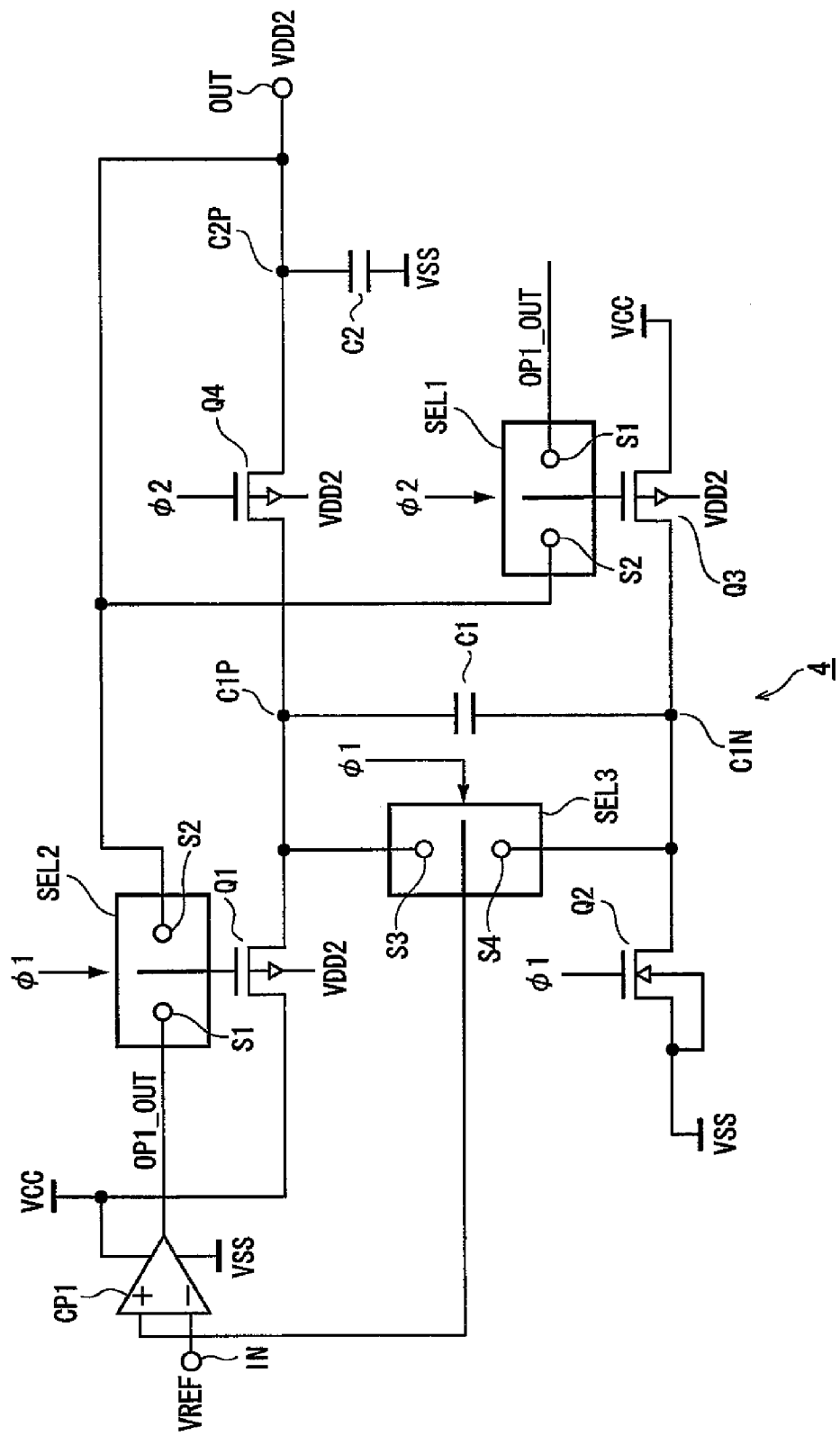
FIG. 10 is a diagram showing the circuit structure of a boosting circuit relating to a fourth exemplary embodiment.

FIG. 10 is a circuit diagram showing the structure of the boosting circuit in the present exemplary embodiment. Regions which are the same as those of the boosting circuit of the third exemplary embodiment shown in FIG. 6 are denoted by the same reference numerals, and repeat description thereof is omitted.

(Structure of Boosting Circuit)

Figure 11:
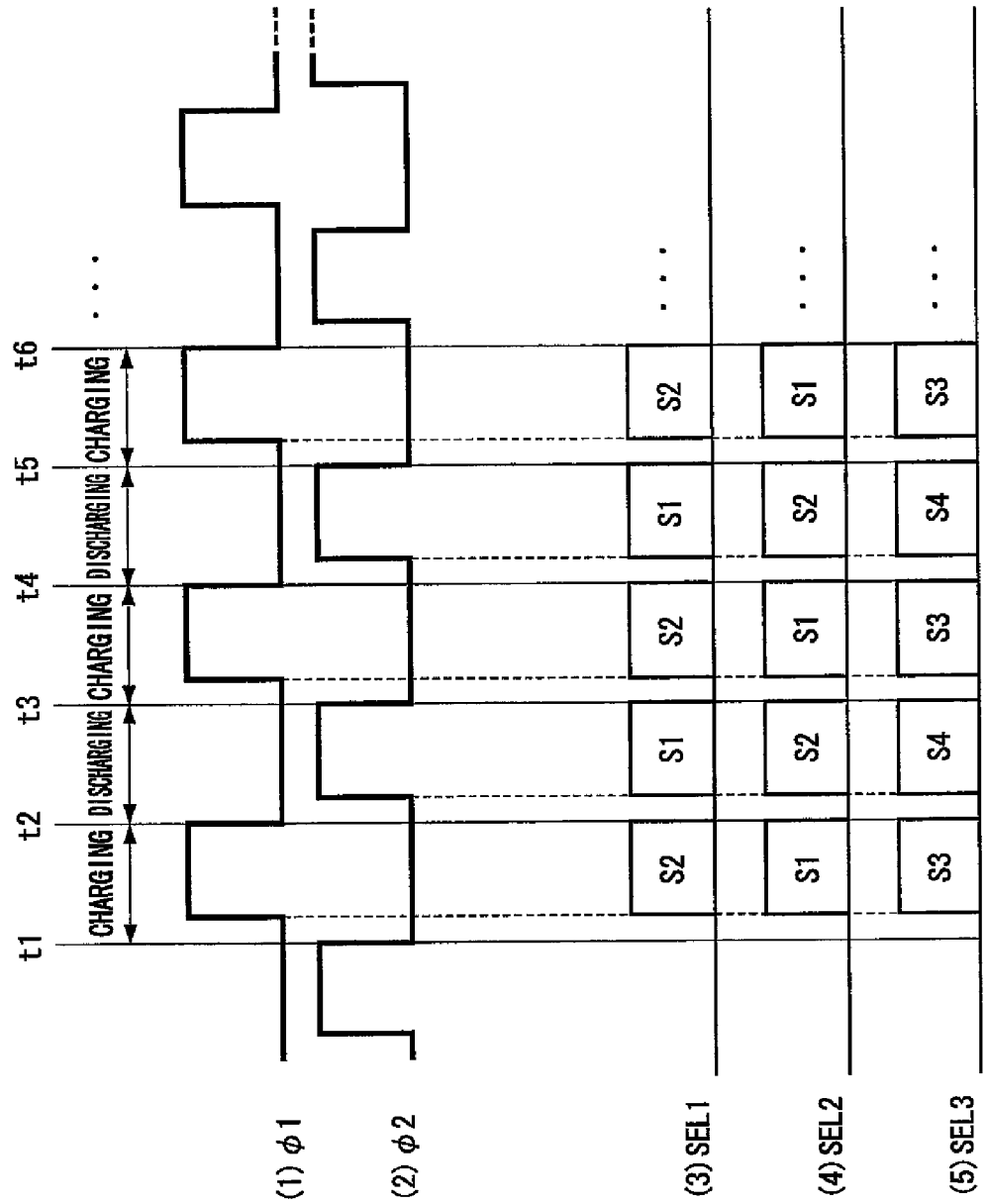
FIG. 11 is a timing chart showing clock signals, which are provided to the boosting circuit relating to the fourth exemplary embodiment, and the selection operations of selectors.

First, the structure of a boosting circuit 4 relating to the present exemplary embodiment will be described with reference to FIG. 10 and FIG. 11. FIG. 11 is a timing chart showing (1) the clock signal φ1 and (2) the clock signal φ2 which are provided to the boosting circuit 4, and the selection operations of (3) the selector SEL1, (4) the selector SEL2, and (5) a selector SEL3 (which will be described later).

In the boosting circuit 4 relating to the present exemplary embodiment, as compared with the boosting circuit 3 (see FIG. 6), the resistors R21, R22 which detect changes in the output voltage are omitted, and instead, there is provided the selector SEL3 (third selector) which is for selecting either the high potential side one end C1P or the low potential side other end C1N of the capacitor C1 which is a boosting capacitor, and connecting it to the non-inverting input terminal of the differential amplifier OP1.

Namely, as shown in FIG. 10, in accordance with the level of the clock signal φ1, the selector SEL3 selects either of a terminal S3, which is connected to the terminal C1P of the capacitor C1, and a terminal S4, which is connected to the terminal C1N of the capacitor C1, and connects it to the non-inverting input terminal of the differential amplifier OP1. Specifically, as shown by (5) in FIG. 11, the selector SEL3 selects the terminal S3 in the period when the clock signal φ1 is high level (the charging period), and selects the terminal S4 in the period when the clock signal φ1 is low level (the discharging period).

In accordance with the above-described structure, in the boosting circuit 4 relating to the present exemplary embodiment, during the charging period, a feedback system, in which the voltage $V_{GS}$ between the gate and the source of the PMOS transistor Q1 varies in accordance with the potential fluctuations of the high potential side terminal C1P of the capacitor C1, is formed via the differential amplifier OP1, and, during the discharging period, a feedback system, in which the voltage $V_{GS}$ between the gate and the source of the PMOS transistor Q3 varies in accordance with the potential fluctuations of the low potential side terminal C1N of the capacitor C1, is formed via the differential amplifier OP1.

(Operation of Boosting Circuit)

Figure 12:
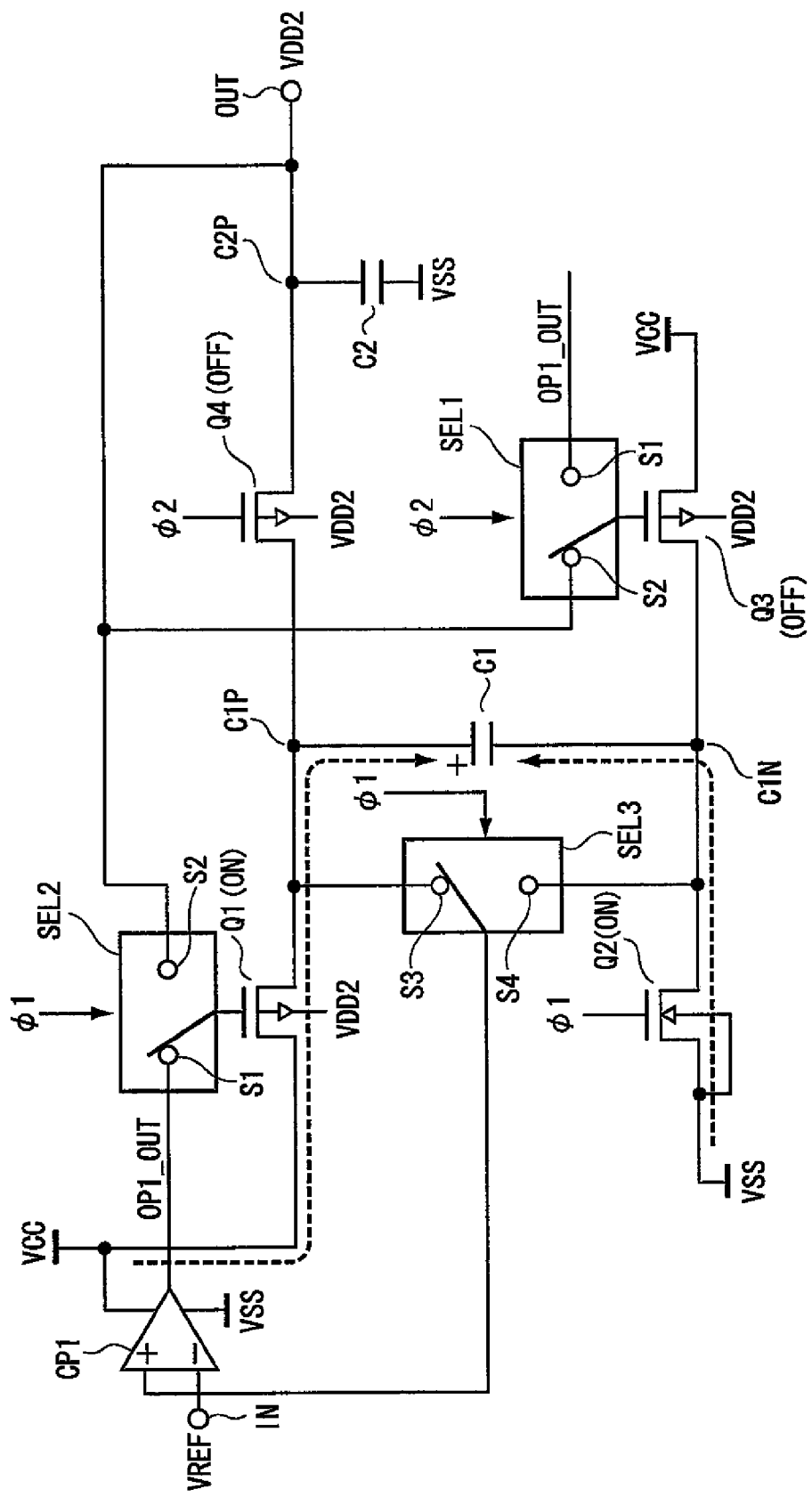
FIG. 12 is a diagram showing a charging operation of the boosting circuit relating to the fourth exemplary embodiment.
Figure 13:
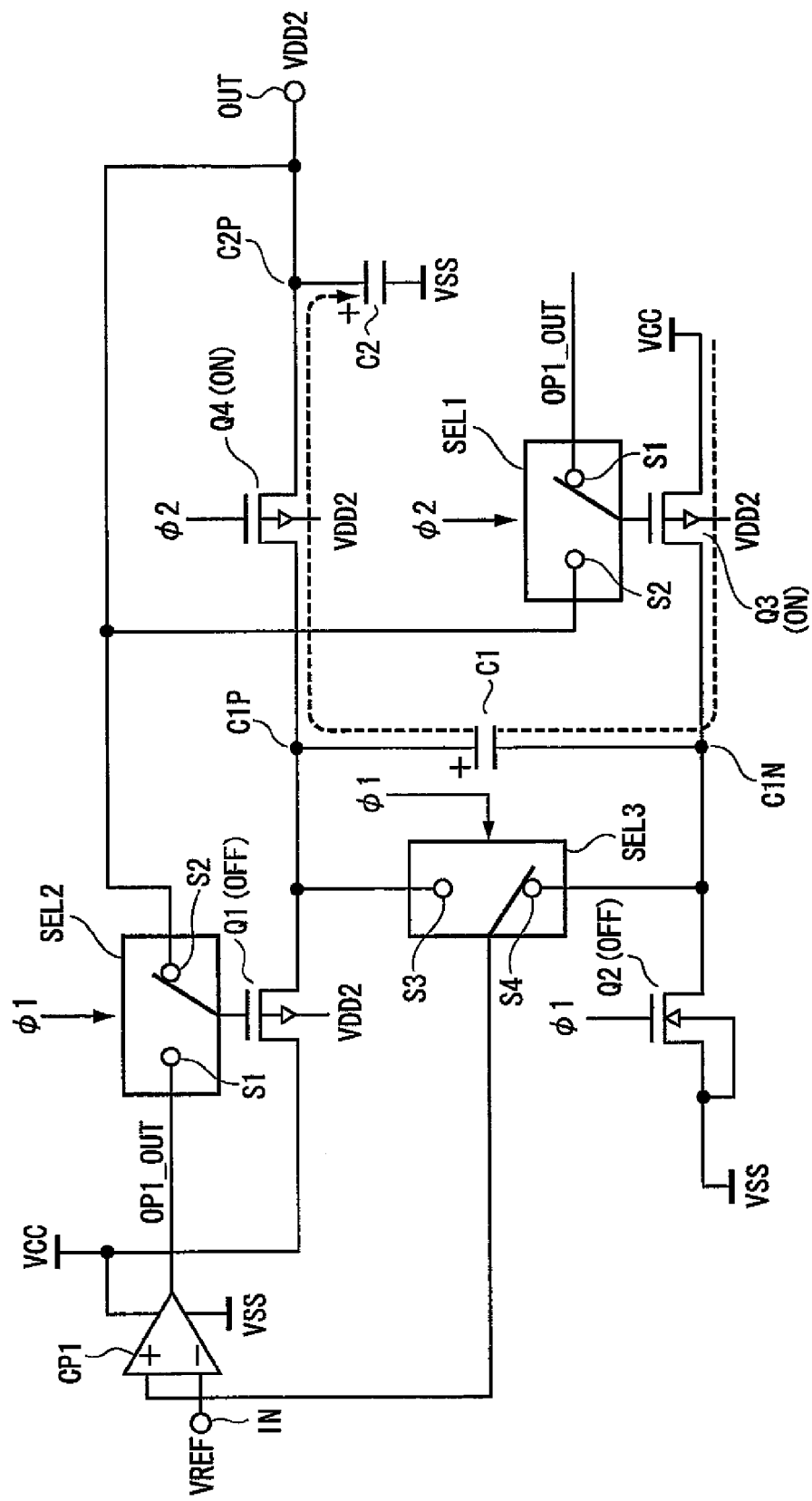
FIG. 13 is a diagram showing a discharging operation of the boosting circuit relating to the fourth exemplary embodiment.

Operation of the boosting circuit 4 relating to the exemplary embodiment will be described next with reference to FIG. 12 and FIG. 13.

(1) Operation During Charging Period

First, the operation during the charging period of the boosting circuit 4 will be described with reference to FIG. 12.

At the boosting circuit 4, the points that, during the charging period in which the clock signal φ1 is high level, the PMOS transistor Q1 and the NMOS transistor Q2 turn on, the voltage (VCC-VSS) is applied to the capacitor C1, and charges are accumulated, are similar to the above-described boosting circuit 3 (see FIG. 8).

During the charging period of the boosting circuit 4, the selector SEL3 selects the terminal S3, and the high potential side terminal C1P of the capacitor C1 and the non-inverting input terminal of the differential amplifier OP1 are connected.

In the charging period of the boosting circuit 4, due to the operation of the differential amplifier OP1, the potential V_C1P of the high potential side terminal C1P of the capacitor C1 is controlled so as to become the same as the potential VREF. This point will be explained hereinafter. Note that, in the following explanation, the state in which the potential V_C1P of the terminal C1P is the same as the potential VREF is called the "equilibrium state".

In the boosting circuit 4, due to the above-described circuit structure, in the charging period, the differential amplifier OP1 monitors the potential V_C1P of the terminal C1P of the capacitor C1. If the equilibrium state breaks down and the potential V_C1P of the terminal C1P becomes higher than the potential VREF, the potential inputted to the non-inverting input terminal (+) of the differential amplifier OP1 becomes higher than the potential VREF of the inverting input terminal (−). Therefore, the output potential OP1_OUT of the differential amplifier OP1 becomes higher than in the case of the equilibrium state. Thus, the voltage $V_{GS}$ between the gate and the source of the PMOS transistor Q1 falls to below that in the case of the equilibrium state, and the on resistance of the PMOS transistor Q1 increases. Due to this increase in the on resistance of the PMOS transistor Q1, the input current to the capacitor C1 decreases, and the voltage between the terminals of the capacitor C1 decreases. The potential V_C1P of the terminal C1P thereby decreases.

On the other hand, if the equilibrium state breaks down and the potential V_C1P of the terminal C1P becomes lower than the potential VREF, the potential inputted to the non-inverting input terminal (+) of the differential amplifier OP1 becomes lower than the potential VREF of the inverting input terminal (−). Therefore, the output potential OP1_OUT of the differential amplifier OP1 becomes lower than in the case of the equilibrium state. Thus, the voltage $V_{GS}$ between the gate and the source of the PMOS transistor Q1 becomes higher than that in the case of the equilibrium state, and the on resistance of the PMOS transistor Q1 decreases. Due to this decrease in the on resistance of the PMOS transistor Q1, the input current to the capacitor C1 increases, and the voltage between the terminals of the capacitor C1 rises. The potential V_C1P of the terminal C1P thereby rises.

At the boosting circuit 4, changes in the potential of the terminal C1P are reflected instantaneously in changes in the current flowing through the PMOS transistor Q1. Therefore, during the charging period, the above-described equilibrium state, i.e., the state in which the potential V_C1P of the terminal C1P of the capacitor C1 is the same as the potential VREF, can be always maintained. Namely, in the same way as the boosting circuit 3 relating to the third exemplary embodiment, the voltage applied to the capacitor C1 is limited to (VREF-VSS) in the charging period.

(2) Operation During Discharging Period (Boosting Operation)

Next, operation during the discharging period of the boosting circuit 4 will be described with reference to FIG. 13.

At the boosting circuit 4, the points that, during the discharging period in which the clock signal φ2 is high level, the PMOS transistor Q3 and the PMOS transistor Q4 turn on and the charges accumulated in the capacitor C1 are discharged and are transferred to the capacitor C2, are similar to the above-described boosting circuit 3 (see FIG. 9).

During the discharging period of the boosting circuit 4, the selector SEL3 selects the terminal S4, and the low potential side terminal C1N of the capacitor C1 and the non-inverting input terminal of the differential amplifier OP1 are connected.

In the discharging period of the boosting circuit 4, due to the operation of the differential amplifier OP1, the potential V_C1N of the low potential side terminal C1N of the capacitor C1 is controlled so as to become the same as the potential VREF. This point will be explained hereinafter. Note that, in the following explanation, the state in which the potential V_C1N of the terminal C1N is the same as the potential VREF is called the "equilibrium state".

In the boosting circuit 4, due to the above-described circuit structure, in the discharging period, the differential amplifier OP1 monitors the potential V_C1N of the terminal C1N of the capacitor C1. If the equilibrium state breaks down and the potential V_C1N of the terminal C1N becomes higher than the potential VREF, the potential inputted to the non-inverting input terminal (+) of the differential amplifier OP1 becomes higher than the potential VREF of the inverting input terminal (−). Therefore, the output potential OP1_OUT of the differential amplifier OP1 becomes higher than in the case of the equilibrium state. Thus, the voltage $V_{GS}$ between the gate and the source of the PMOS transistor Q3 falls to below that in the case of the equilibrium state, and the on resistance of the PMOS transistor Q3 increases. Due to this increase in the on resistance of the PMOS transistor Q3, the amount of the drop in voltage at the PMOS transistor Q3 becomes greater than in the case of the equilibrium state, and the potential V_C1N of the terminal C1N decreases.

On the other hand, if the equilibrium state breaks down and the potential V_C1N of the terminal C1N becomes lower than the potential VREF, the potential inputted to the non-inverting input terminal (+) of the differential amplifier OP1 becomes lower than the potential VREF of the inverting input terminal (−). Therefore, the output potential OP1_OUT of the differential amplifier OP1 becomes lower than in the case of the equilibrium state. Thus, the voltage $V_{GS}$ between the gate and the source of the PMOS transistor Q3 becomes higher than that in the case of the equilibrium state, and the on resistance of the PMOS transistor Q3 decreases. Due to this decrease in the on resistance of the PMOS transistor Q3, the amount of the drop in voltage at the PMOS transistor Q3 becomes less than in the case of the equilibrium state, and the potential V_C1N of the terminal C1N rises.

At the boosting circuit 4, changes in the potential of the terminal C1N are reflected instantaneously in changes in the current flowing through the PMOS transistor Q3. Therefore, during the discharging period, the above-described equilibrium state, i.e., the state in which the potential V_C1N of the terminal C1N of the capacitor C1 is the same as the potential VREF, can be always maintained.

In the boosting circuit 4, in the equilibrium state during the charging period, the potential V_C1P of the terminal C1P (the high potential side terminal) of the capacitor C1 is maintained so as to be the potential VREF, i.e., the voltage between terminals of the capacitor C1 is maintained so as to be (VREF-VSS), and thereafter, in the equilibrium state during the discharging period, the potential V_C1N of the terminal C1N (the low potential side terminal) of the capacitor C1 is maintained so as to be the potential VREF. Accordingly, in the boosting circuit 4, the output potential VDD2 becomes (2×VREF-VSS), and the output voltage is boosted to twice the input voltage.

As described above, the boosting circuit relating to the present exemplary embodiment has, in addition to the structure of the boosting circuit 3 of the third exemplary embodiment, the selector SEL3 which selects the high potential side terminal of the capacitor C1 during the charging period, and selects the low potential side terminal of the capacitor C1 during the discharging period, and connects the selected terminal to the non-inverting input terminal of the differential amplifier OP1. Therefore, effects which are similar to those of the boosting circuit 1 of the first exemplary embodiment and the boosting circuit 3 of the third exemplary embodiment, i.e., improvement in the current driving ability, suppression of rush current at the time of charging, and the like, are obtained, and, in addition, the resistors (R21, R22) for detecting changes in the output voltage can be omitted. Accordingly, the boosting circuit can be fabricated at a low cost.

Exemplary embodiments of the present invention have been described above in detail, but the specific structure is not limited to the present exemplary embodiments, and changes in design, other modifications, and the like within a scope which does not depart from the gist of the present invention are included.

For example, in the present exemplary embodiments, description is given of cases in which MOS transistors are used as the switching elements of the present invention. However, the present invention is not limited to MOS transistors, and other switching elements, such as MIS transistors, bipolar transistors, thyristors, and the like, can be also used.

What is claimed is:

1. A boosting circuit boosting a first potential to a second potential, the boosting circuit comprising:
    a differential amplifier to which the first potential is inputted, and which outputs a potential corresponding to a change in the second potential;
    a boosting capacitor alternately repeating a charging period and a discharging period;
    a first switching element connected between a first reference potential, which is higher than the first potential, and one end of the boosting capacitor, and turning on in the charging period of the boosting capacitor;
    a second switching element connected between a second reference potential, which is lower than the first potential, and another end of the boosting capacitor, and turning on in the charging period of the boosting capacitor;
    a third transistor serving as a third switching element which is connected between the first reference potential and the other end of the boosting capacitor, and which turns on in the discharging period of the boosting capacitor;
    a fourth switching element connected between an output terminal of the second potential and the one end of the boosting capacitor, and turning on in the discharging period of the boosting capacitor; and
    a first selector selecting the second potential in the charging period of the boosting capacitor, and selecting an output potential of the differential amplifier in the discharging period of the boosting capacitor, and providing a selected potential to a control terminal of the third transistor.

2. The boosting circuit of claim 1, wherein the first switching element includes a diode whose forward direction is from the first reference potential toward the one end of the boosting capacitor.

3. The boosting circuit of claim 1, wherein the first switching element is a first transistor, and
    the boosting circuit further comprising a second selector selecting the output potential of the differential amplifier in the charging period of the boosting capacitor, and selecting the second potential in the discharging period of the boosting capacitor, and providing a selected potential to a control terminal of the first transistor.

4. The boosting circuit of claim 3, further comprising:
    a third selector selecting the one end of the boosting capacitor in the charging period of the boosting capacitor, and selecting the other end of the boosting capacitor in the discharging period of the boosting capacitor,
    wherein the first potential, and a potential of the one end or the other end which is selected by the third selector, are inputted to the differential amplifier.

* * * * *